(12) United States Patent
Chilese et al.

(10) Patent No.: US 9,759,912 B2
(45) Date of Patent: Sep. 12, 2017

(54) PARTICLE AND CHEMICAL CONTROL USING TUNNEL FLOW

(71) Applicants: KLA-Tencor Corporation, Milpitas, CA (US); Sandia Corporation, Albuquerque, NM (US)

(72) Inventors: Frank Chilese, San Ramon, CA (US); Gildardo R. Delgado, Livermore, CA (US); Daniel Wack, Fredericksburg, VA (US); John R. Torczynski, Albuquerque, NM (US); Leonard E. Klebanoff, Dublin, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 792 days.

(21) Appl. No.: 14/034,273

(22) Filed: Sep. 23, 2013

(65) Prior Publication Data
US 2014/0085724 A1   Mar. 27, 2014

Related U.S. Application Data

(60) Provisional application No. 61/706,062, filed on Sep. 26, 2012.

(51) Int. Cl.
    *G02B 27/00*  (2006.01)
(52) U.S. Cl.
    CPC ............... *G02B 27/0006* (2013.01)
(58) Field of Classification Search
    CPC .................................... G02B 27/0006
    See application file for complete search history.

(56) References Cited

U.S. PATENT DOCUMENTS

| | | |
|---|---|---|
| 7,365,351 B2 | 4/2008 | Bowering et al. |
| 7,732,794 B2 | 6/2010 | Abe et al. |
| | (Continued) | |

FOREIGN PATENT DOCUMENTS

| | | |
|---|---|---|
| EP | 1057079 A1 | 12/2000 |
| EP | 1434098 A2 | 6/2004 |

OTHER PUBLICATIONS

Cheng et al. "Illuminance formation and color difference of mixed-color LEDs in a rectangular light pipe". Applied Optics. Val. 47, No. 3 Jan. 2008.*

(Continued)

*Primary Examiner* — Donald Spamer
(74) *Attorney, Agent, or Firm* — Simpson & Simpson, PLLC (57) ABSTRACT

An apparatus for contaminant control, having: a first optical assembly including: a first light homogenizer tunnel with: a first end connected to an extreme ultra-violet light source, a second end in communication with a destination chamber, a first enclosed space, and, a first gas input arranged to introduce a first gas such that the first gas flows in a first direction toward the first end and in a second direction toward the second end. The apparatus alternately having: a second optical assembly including: a second light homogenizer tunnel with: a third end connected to an extreme ultra-violet light source, a fourth end in communication with a destination chamber, a second enclosed space, a diffusion barrier tube including: a fifth end facing the fourth end and a sixth end in communication with a destination chamber, and a second gas input between the second light homogenizer tunnel and the diffusion tube.

13 Claims, 6 Drawing Sheets

(56) References Cited

U.S. PATENT DOCUMENTS

| | | |
|---|---|---|
| 8,129,702 B2 | 3/2012 | Bakker et al. |
| 8,158,959 B2 | 4/2012 | Assayama et al. |
| 8,283,643 B2 | 10/2012 | Partlo et al. |
| 2004/0179182 A1 | 9/2004 | Bakker |
| 2008/0267816 A1 | 10/2008 | Ueno et al. |
| 2009/0301517 A1 | 12/2009 | Asayama et al. |
| 2012/0025109 A1 | 2/2012 | Abhari et al. |

OTHER PUBLICATIONS

Jha et al. "Sintered Metal Hot Gas Filters". Mott Corp. Sep. 1999.*

* cited by examiner

PARTICLE AND CHEMICAL CONTROL USING TUNNEL FLOW

CROSS-REFERENCE TO RELATED APPLICATIONS

This application claims the benefit under 35 U.S.C. §119(e) of U.S. Provisional Patent Application No. 61/706,062, filed Sep. 26, 2012, which application is incorporated herein by reference.

STATEMENT REGARDING FEDERALLY SPONSORED RESEARCH OR DEVELOPMENT

This invention was made under a CRADA (SC11/01785.00) between KLA-Tencor and Sandia Corporation, operated for the United States Department of Energy. The Government has certain rights in this invention.

This invention was developed with Government support under Contract No. DE-AC04-94AL85000 between Sandia Corporation and the U.S. Department of Energy. The U.S. Government has certain rights in this invention.

TECHNICAL FIELD

The present disclosure relates to a method and apparatus for controlling particles and chemicals in a vacuum system. In particular, the present disclosure relates to a method and apparatus for controlling particle and chemical contamination produced from generated extreme ultra-violet (EUV) light and directed toward an optics element, for example, for semiconductor integrated circuit manufacturing photolithography process performing machines.

BACKGROUND

Extreme ultra-violet (EUV) light can be used in inspection tools which typically have a volume allocated to EUV creation, called the Source Area, and a volume allocated to optical inspection, called the Projection Optics Area. All apparatuses that create EUV light also create unwanted contamination or oxidation as part of that EUV generation. This contamination or oxidation can take the form of particles, ions, or gaseous chemicals. Retical inspection tools using EUV light can have a limited operational lifetime due to such contamination. Similarly, maintenance of such retical inspection tools can be costly when repairs are necessary due to the particle and chemical contamination. Accordingly, it is desirable to allow the EUV light to propagate from the Source Area to the Projection Optics Area, while allowing as little of the contamination to propagate along the same path.

Particle control in light-based reticle inspection is done with flowing air, preventing flow or diffusion of the particles in a known direction, but this method is not broadly possible in a vacuum system. In vacuum systems (such as in electron beam inspectors), particle control is done with slight amounts of positive pressure or particle reduction methods designed to reduce the number of particles in general. In some EUV systems, protection is achieved using high-velocity gas jets moving across the optical path.

One such system and method for protecting an EUV light source plasma production chamber optical element from contamination generated by plasma formation is disclosed in U.S. Pat. No. 7,365,351 (Bowering et al.). This reference discloses a shield system having at least one hollow tube positioned in between the plasma generation site and the optical element. The tube disclosed is arranged to capture debris. A gas system is operatively arranged to release gas into the tube and flow the gas toward the EUV light source.

Japanese Patent Application No. 2005-197456 discloses a technique for controlling ion debris using a magnetic field. Positively-charged ion debris can be collected and/or directed away from the surrounding optical elements by the magnetic field.

U.S. Pat. No. 8,158,959 (Asayama et al.) discloses a device for controlling a flow of ions generated with EUV light including an ion collector which collects ions through an aperture arranged at a side of a chamber, an interrupting mechanism arranged inside the ion collector device, and an ion collision surface which tilts with respect to a direction of movement of the ion.

However, the protection factors created are too low, or they work for particles but not for chemical protection, or they require large amounts of gas flow (and, consequently, large and expensive pumping systems). There is no system that can be arranged to supply a particular amount of gas to the plasma generation site and simultaneously supply another amount of gas to the optical element (larger or smaller) based on the individual requirements of the system.

SUMMARY

According to aspects illustrated herein, there is provided an apparatus for contaminant control, having: a first optical assembly or a second optical assembly. The first optical assembly includes: a first light homogenizer tunnel with: a first end arranged for connection to an extreme ultra-violet (EUV) light source, a second end arranged for communication with a destination chamber, and, a first enclosed space connecting the first and second ends and arranged to reflect light from the EUV light source, and, a first gas input located between the first and second ends and arranged to introduce a first gas into the first enclosed space such that the first gas flows in a first direction toward the first end and in a second direction toward the second end. The second optical assembly includes: a second light homogenizer tunnel with: a third end arranged for connection to an EUV light source, a fourth end arranged for communication with a destination chamber, and, a second enclosed space connecting the third and fourth ends and arranged to reflect light from the EUV light source, a diffusion barrier tube located between the second light homogenizer tunnel and including: a fifth end facing the fourth end and a sixth end arranged for communication with a destination chamber, and a second gas input arranged to introduce a second gas between the second light homogenizer tunnel and the diffusion tube.

According to aspects illustrated herein, there is provided an apparatus for contaminant control, having: a light homogenizing tunnel including: a longitudinal axis, a first end arranged for connection to an extreme ultra-violet (EUV) light source, a second end arranged for communication with a destination chamber, and, an enclosed space: connecting the first and second ends, and, with a rectangular shape in a cross-section orthogonal to the longitudinal axis, and, a sintered gas diffuser: located between the first and second ends and arranged to introduce a gas into the enclosed space such that the gas flows in a first direction toward the first end and in a second direction toward the second end.

According to aspects illustrated herein, there is provided an apparatus for contaminant control, having: a light homogenizing tunnel including: a first end arranged for connection to an extreme ultra-violet (EUV) light source, a second end having a first cross-sectional area, and, a first enclosed space: connecting the first and second ends, and, with a rectangular shape in a cross-section orthogonal to a longitudinal axis for the light homogenizer tunnel, a diffusion barrier tube including: a third end facing the second end and having a second cross-sectional area less than the first cross-sectional area, a fourth end arranged for communication with a destination chamber and having a third cross-sectional area greater than the second cross-sectional area, and, a second enclosed space connecting the third and fourth ends, and, a sintered gas diffuser: located between the light homogenizer tunnel and the diffusion barrier tube, and, arranged to introduce a gas between the light homogenizer tunnel and the diffusion barrier tube.

According to aspects illustrated herein, there is provided a method for controlling contaminants along a light homogenizer tunnel formed by a first end in communication with an extreme ultra-violet (EUV) light source emitting EUV light, a second end in communication with a destination chamber, and an enclosed space connecting the first and second ends, the method having: introducing a gas into the enclosed space at an area between the first and second ends, flowing a first portion of the gas from the area toward the first end, and, flowing a second portion of the gas from the area toward the second end.

According to aspects illustrated herein, there is provided a method for controlling contaminants in a system including a light homogenizing tunnel and a diffusion barrier tube, the light homogenizing tunnel including a first end arranged for connection to an extreme ultra-violet (EUV) light source, a second end, and an enclosed space connecting the first and second ends, the diffusion tube including a third end facing the second end and a fourth end arranged for communication with a destination chamber, the method having: introducing a gas into a third enclosed space connecting the second and third ends, flowing a first portion of the gas through the light homogenizing tunnel at a first rate, and, flowing a second portion of the gas through the diffusion barrier tube at a second rate.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
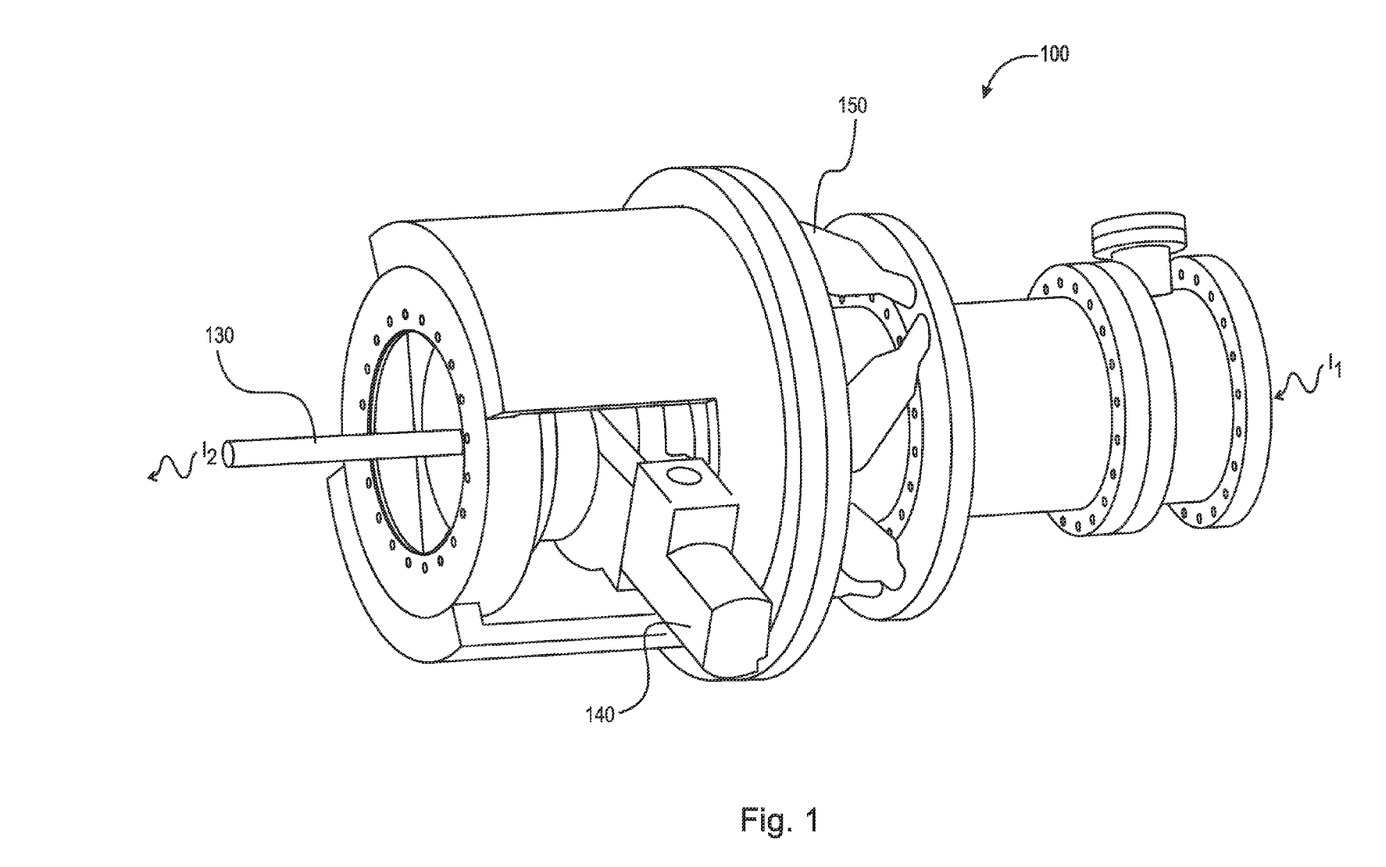
FIG. 1 illustrates an example embodiment of an apparatus for contaminant control.
Figure 2:
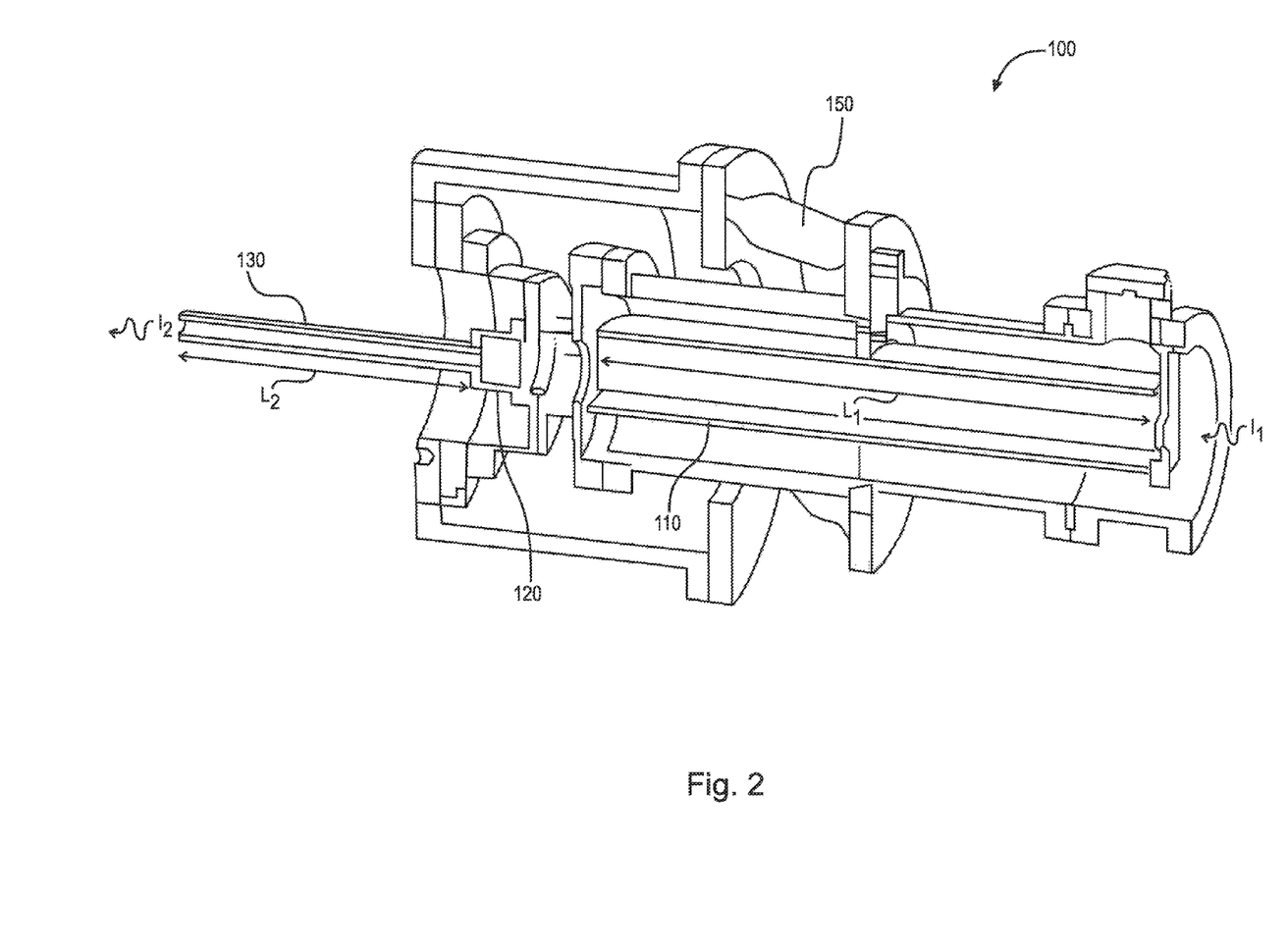
FIG. 2 is a cross-sectional view of the apparatus shown in FIG. 1.
Figure 3:
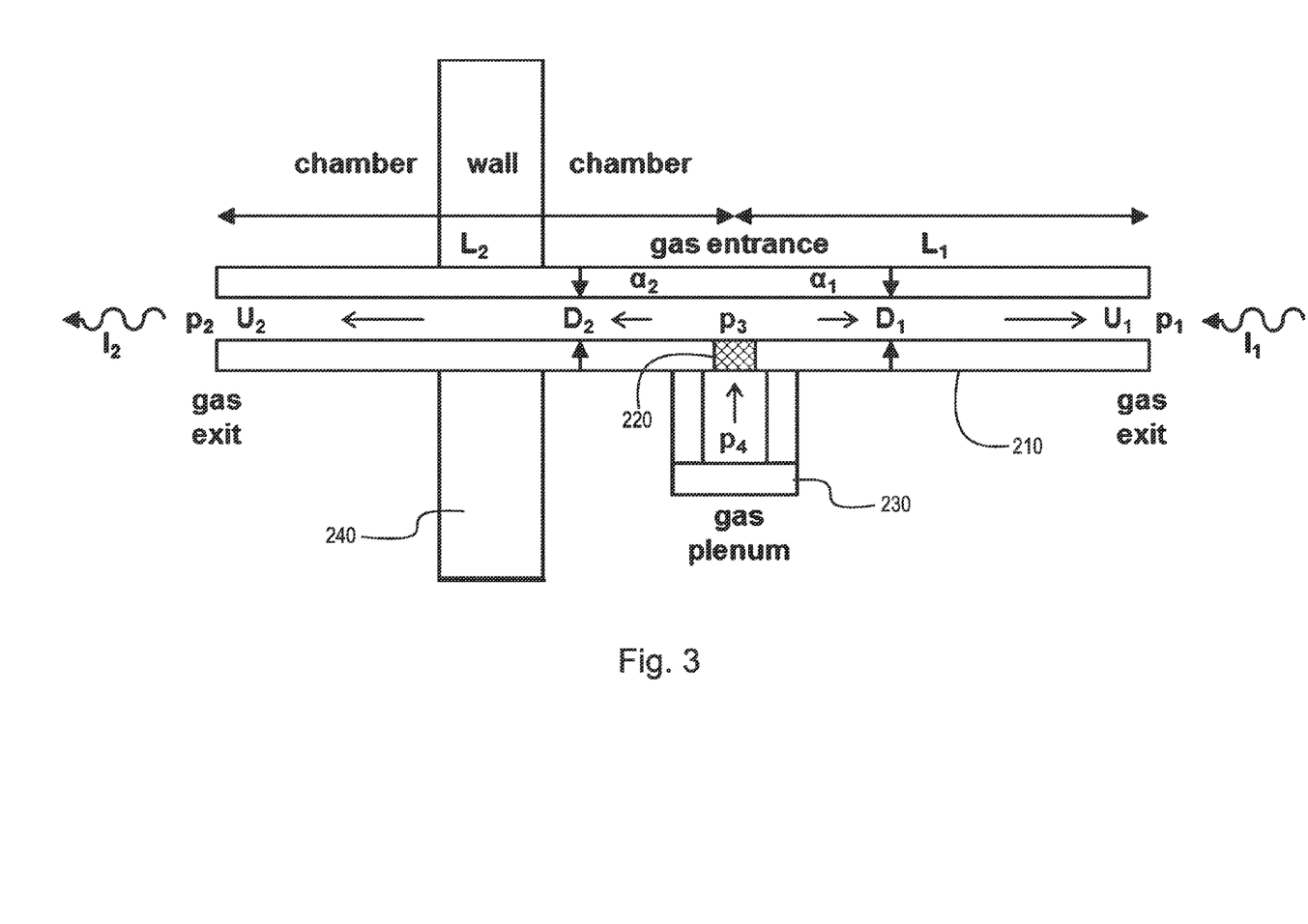
FIG. 3 is a schematic side view of an example embodiment.

Referring now to the Figures, the following should be viewed in light of FIGS. 1 through 3. An apparatus for contaminant control comprises optical assembly 100 shown in FIGS. 1 and 2 or the optical assembly shown in FIG. 3.

Assembly 100 includes light homogenizer tunnel 110 with a first tunnel end arranged for connection to an extreme ultra-violet (EUV) light source, a second tunnel end arranged for communication with a destination chamber and, an enclosed space connecting the first and second tunnel ends and arranged to reflect light from the EUV light source. Assembly 100 also includes diffusion barrier tube 130 located between light homogenizer tunnel 110 with a first tube end facing the second tunnel end of tunnel 110, and, a second tube end arranged for communication with a destination chamber. Further, assembly 100 includes gas input 120 arranged to introduce a gas between light homogenizer tunnel 110 and diffusion tube 130.

The optical assembly shown in FIG. 2 includes light homogenizer tunnel 210 with a first tunnel end arranged for connection to an extreme ultra-violet (EUV) light source, a second tunnel end arranged for communication with a destination chamber and a first enclosed space connecting the first and second ends and arranged to reflect light from the EUV light source. This optical assembly also includes gas input 220 located between the first and second tunnel ends of tunnel 210 and arranged to introduce a gas into the enclosed space of tunnel 210 such that the first gas flows in a first direction toward the first tunnel end and in a second direction toward the second tunnel end.

As best seen in FIG. 2, the EUV light propagates through tunnels 110 and 130 before exiting tunnel 130 to a destination chamber EUV as EUV light $I_2$. No other pathway for chemical or particle flow exists besides along this light path.

Referring to FIG. 2, to control the contamination build up along this light path, a gas is provided through input 120 to generate both a gas flow across length $L_1$ of tunnel 110 in a direction toward the EUV light source and a gas flow across length $L_2$ of tunnel 130 in a direction toward the destination chamber. This allows the entire length $L_1$ of tunnel 110 to be used for protection in one direction, and allows tunnel 130 to be optimized for flow in the other direction. This allows the design to, for example, be used both for contamination protection but also for supplying a larger amount of flow to one side of the design if this is needed for purge control, for example. This provides chemical and particle protection in both directions as well as isolating the EUV light source and the destination chamber from one another.

Optionally, adding gas jets or curtains (not shown) at either ends of tunnel 110 or tunnel 130 can provide further protections against contaminants. Also, the output of tunnels 110 and 130 can be designed in such a way as to create a uniform curtain that can be used as additional protection and used for metrology purposes. The gas curtain, in addition, can be ionized and/or temperature controlled, and tunnels 110 and 130 may be temperature controlled to further customize chemical or particle protection factors.

FIG. 1 also shows assembly 100 having isolation valve 140 in order to isolate the EUV light source from the destination chamber between tunnels 110 and 130 allowing for service of various items within assembly 100 without venting the entire vacuum system. Alignment hexapod 150 aids in aligning tunnels 110 and 130 in a co-linear fashion. Isolation valve 140 and alignment hexapod 150 are optional.

In an example embodiment, tunnel 110, 210 is a rectangular light homogenizing tunnel with a rectangular enclosed space. The interior surfaces of the homogenizing tunnel create one or more grazing-incidence angle reflective bounces in order to keep a constant EUV light intensity throughout tunnel 110, 210. Since the homogenizer tunnel bore is typically quite small (<5 mm effective diameter) and quite long (>200 mm), the amount of flowing gas required to provide large protection factors is relatively small when compared to alternative protection schemes. However, tunnel 110, 210 is not limited to being a homogenizing tunnel and can be made of metal or glass or other material and can be a non-optical tube. One end of tunnel 110 is proximate the EUV light source and the other end of tunnel 110 is proximate tunnel 130.

In an example embodiment, diffusion barrier tube 130 is shaped as a conical frustum with a correlating enclosed space of the same shape. The conical frustum shape is to accommodate the diffusion of the EUV light as it is no longer actively being homogenized like in tunnel 110, 210. Accommodating for the diffusion of the EUV light with the conical frustum shape enables assembly 100 to block no EUV light except that portion of the light that is absorbed by the gas. However, diffusion barrier tube 130 may also be an optical tube such as a homogenizing tunnel. As such, tunnels 110 and 130 may both be non-optical tubes or tunnels, may both be optical tubes, or may be a combination of a homogenizer tunnel and a non-optical tube.

In an example embodiment including the diffusion barrier tube, the end of the light homogenizer tunnel 110 arranged for communication with a destination chamber has a cross-sectional area orthogonal to a longitudinal axis for light homogenizer tunnel 110. The end of diffusion barrier tube 130 facing the end of light homogenizer tunnel 110 arranged for communication with the EUV light source has another cross-sectional area orthogonal to the longitudinal axis which is less than the former cross-sectional area. The end of diffusion barrier tube 130 arranged for communication with a destination chamber has a cross-sectional area orthogonal to the longitudinal axis which is greater than the cross-sectional area of the end of diffusion barrier tube 130 facing the end of light homogenizer tunnel 110 arranged for communication with a destination chamber.

In an example embodiment, light homogenizer tunnel 110 includes a longitudinal axis and diffusion barrier tube 130 includes a longitudinal axis that is co-linear.

In a further example embodiment, the optical assembly further includes an enclosed area connecting the end of light homogenizer tunnel 110 arranged for communication with a destination chamber and the end of diffusion barrier tube 130 facing the end of light homogenizer tunnel 110 arranged for communication with a destination chamber.

Gas input 120 is located between the EUV light source and the destination chamber at the end of tunnel 130 that is distal to the destination chamber. The gas can be injected through input 120 via a sintered metal plate or introduced around the circumference of tunnel 130 using an annular sintered diffuser. The planar or sintered diffusers create flow conditions that are less sensitive to supply gas pressure due to the large flow impedance of these sintered diffusers.

FIG. 3 is a schematic of an embodiment of the current disclosure having gas input 220 introducing a gas into tunnel 210 such that a gas flows in two directions at the same time within the same tunnel. Tunnel 210 can be metal or glass or other material, but, in an example embodiment, tunnel 210 is an optical homogenizer tunnel. The EUV light travels down the length of the tunnel 210 unhindered, but the gas flows out from the location of gas input 220 to both ends of tunnel 210, creating a long flow field to greatly reduce the flow of any contaminants from one end of tunnel 210 to the other.

Gas is introduced through input 220 and flows in direction $D_1$ toward the EUV light source and in direction $D_2$ toward the destination chamber. Gas flow length $L_1$ is the length of tunnel 210 from gas input 220 to the end of the tunnel proximate the EUV light source while gas flow length $L_2$ is the length of tunnel 210 from gas input 220 to the end of the tunnel proximate the destination chamber. The wall and chambers are shown to provide context only. The wall separates the chamber containing the EUV light source providing EUV light $I_1$ from the destination chamber receiving EUV light $I_2$. Positioning input 220 closer to one end of tunnel 210 than the other allows the gas flow, and therefore the protection factor against contaminants (as will be described in further detail with reference to FIGS. 4-6), to be customizable in order to better meet the needs of the system for different applications. The gas can be injected through input 220 via a sintered metal plate or introduced around the circumference of tunnel 230 using an annular sintered diffuser.

The introduction of the gas into tunnel 210 and the gas flow within tunnel 210 (as well as the introduction and gas flow within tunnel 110 in FIG. 2) are driven by gas pressure differentials. Gas flows from gas plenum 230 into tunnel 210 because pressure $p_4$ of gas plenum 230 is greater than pressure $p_3$ of tunnel 210 at gas input 220. Exiting pressures $p_1$ and $p_2$, and exiting gas rates $U_1$ and $U_2$ at the ends of tunnel 210 are described in more detail with respect to FIGS. 4-6. For a given tunnel size, the afforded protection from the flow is a function of the product of tunnel length $L_1$ or $L_2$, gas exit pressure $p_1$ or $p_2$, and gas exit rate $U_1$ and $U_2$. Atmospheric pressures $a_1$ and $a_2$ counteract the radial pressure from the pressure in tunnel 210 so that the gas flows axially.

In an example embodiment, pressures below 150 Pa of high purity of gas (examples may include hydrogen, helium, Xenon or argon, or a mixture of gasses, all of which under appropriate use exhibit relatively low EUV absorption) are used to reside or flow within the various volumes of the EUV inspection tool. For example, high purity gas can also be delivered with extremely low humidity and or low oxygen. This can be achieved with but not limited to gas purifies, filterers or getters. The choice of protective capping coating layer on tunnels 120, 130 or 210 can influence the selection of gas or gas mixtures.

In an example embodiment, a method for controlling contaminants along light homogenizer tunnel 110, 210 formed by an end in communication with an EUV light source emitting light, an end in communication with a destination chamber, and an enclosed space connecting the ends includes:
    introducing gas into the enclosed space at an area between the ends of light homogenizer tunnel 110, 210;
    flowing a portion of the gas from the area toward one end; and,
    flowing another portion of the gas from the area toward the other end.

In an example embodiment, the method for controlling contaminants includes homogenizing the EUV light through tunnel 110, 210.

In an example embodiment, the method for controlling contaminants includes positioning the area, between the ends of light homogenizing tunnel 110, 210, to control flow rates for the gases. In a further example embodiment, the method includes positioning the area closer to one end to increase one flow rate or positioning the area closer to the other end to increase the other flow rate.

In an example embodiment, the method of controlling contaminants controls flow rates of gas using cross-sectional areas of the ends.

In an example embodiment, the method of controlling contaminants includes an interior surface bounding the enclosed space and the method includes transmitting EUV light through the enclosed space and transmitting the EUV light through another enclosed space such that the EUV light does not contact the interior surface.

Figure 4:
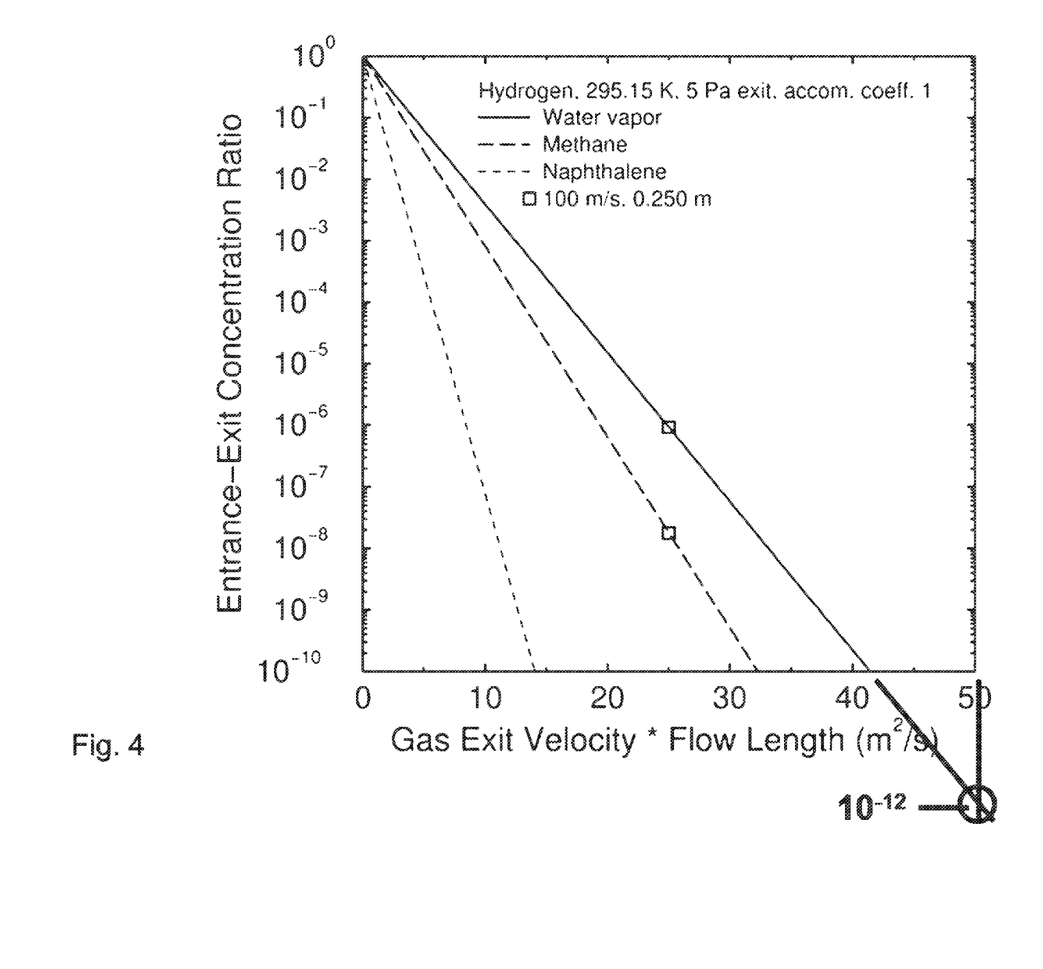
FIG. 4 is a graphical representation of the protection factor for various chemical contaminants.
Figure 5:
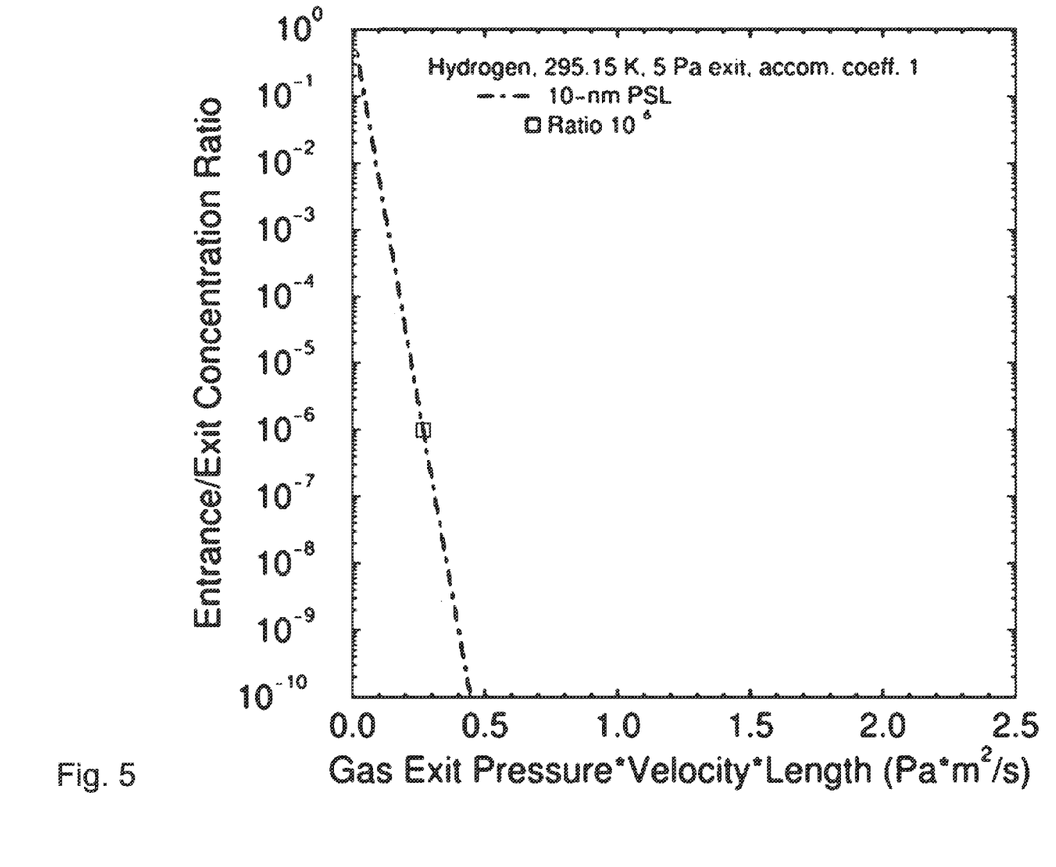
FIG. 5 is a graphical representation of the protection factor for a particle contaminant; and, FIG. 6 is a graphical representation of the pressure required to drive a presumed level of flow through a tunnel.

FIGS. 4 and 5 are graphs indicating the large protection factors achievable for chemical and particle contaminants with the gas flow methods utilized by the example embodiments of the current disclosure. FIG. 4 is a graph illustrating what the protection factor (which is the inverse of the Entrance-Exit Concentration Ratio) could be for a tube or tunnel similar in size to the example embodiments of the current disclosure for the chemical contaminants of water vapor, methane and naphthalene if the gas used for the gas flow is Hydrogen with an exit pressure (for example $p_1$ or $p_2$ shown in FIG. 3 or the analogous pressures for tunnel 110 and tube 130 in FIG. 1) of 5 Pa. The graph shows that concentrations of chemical contaminants decrease exponentially when diffusing upstream (tunnel length $L_1$ or $L_2$ in FIGS. 2 and 3) against carrier gas flow, as is demonstrated by the different abscissa ranges for the different contaminants. It shows that a 10 mm diameter tube that is 500 mm long, with 100 msec molecular flow ($U_1$ or $U_2$ in FIG. 3) at the exit of the tube, can create a protection factor of $10^{12}$ against water. Water is one of the more diffusive chemicals an EUV system might be sensitive to, as is demonstrated by the large circled position on the extension of the water vapor line. The protection factor is also a function of the diffusion coefficient of the contaminant, whether it is a chemical molecule or a particle, and the gas that is flowing.

FIG. 5 is a graph illustrating the protection factor for a particle contaminant as opposed to chemical contaminants. As is demonstrated with the graph in FIG. 5 in comparison with the graph in FIG. 4, it is much easier to stop particles than chemicals. For example, to provide a protection factor of 1,000,000 (shown by the small boxes on the graphs in both FIGS. 4 and 5), a product of 50-150 Pa·m2/sec is needed to stop most chemicals of concern (FIG. 4), while only 0.3 Pa·m2/sec is needed to stop a difficult size (10 nm) polystyrene latex particle (FIG. 5). Polystyrene latex is a standard density particle used for analytical comparisons.

Figure 6:
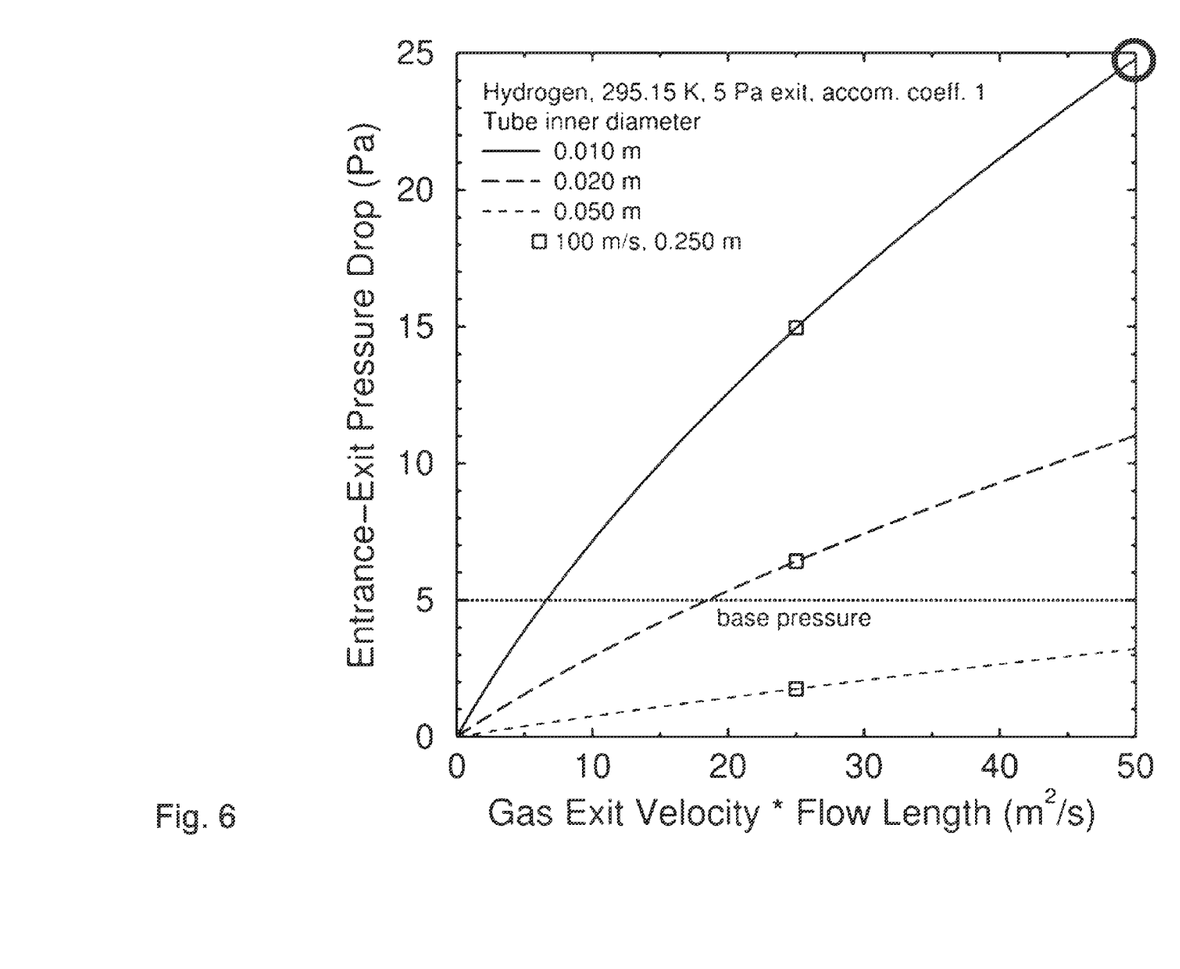

FIG. 6 is a graph showing the pressure drop that would be required to drive a 100 msec molecular hydrogen flow at 5 Pa through a tube of a given size. The operating point indicated with the large circled portion shows that a 25 Pa pressure difference would drive the required flow through a 10 mm diameter tube that is 500 mm long. This pressure field (30 Pa at one end of the tube and 5 Pa at the other end) could represent an acceptable light loss (due to absorption of the EUV in hydrogen) to an EUV system.

In view of the graphs shown in FIGS. 4-6, assembly 100 shown in FIG. 2 has an advantage over the example embodiment shown in FIG. 3 by effectively doubling length $L_1$ of the flow path toward the EUV light source. Doubling this flow length squares the protection factor provided by the flow. However, increasing the flow length affects the optical qualities of the instrument because the EUV light also has to propagate further. In this way, the example embodiment shown in FIG. 3 has an advantage over assembly 100 shown in FIG. 2 by decreasing the length of the EUV light path.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for contaminant control, comprising:
a first optical assembly or a second optical assembly, wherein:
the first optical assembly includes:
a first light homogenizer tunnel with:
a first end arranged for connection to an extreme ultra-violet (EUV) light source;
a second end arranged for communication with a destination chamber; and,
a first enclosed space connecting the first and second ends and arranged to reflect light from the EUV light source; and,
a first gas input;
located between the first and second ends; and,
arranged to introduce a first gas into the first enclosed space such that the first gas flows in a first direction toward the first end to advect a contaminant out the first end and in a second direction toward the second end to advect the contaminant out the second end, such that a ratio of contaminant remaining in the first enclosed space to contaminant advected from the first enclosed space is equal to or less than $10^{-6}$; and,
the second optical assembly includes:
a second light homogenizer tunnel with:
a third end arranged for connection to a second extreme ultra-violet (EUV) light source;
a fourth end arranged for communication with a second destination chamber; and,
a second enclosed space connecting the third and fourth ends and arranged to reflect light from the second EUV light source;
a diffusion barrier tube located between the second light homogenizer tunnel and the second destination chamber including:
a fifth end facing the fourth end; and,
a sixth end arranged for communication with the second destination chamber; and,
a second gas input arranged to introduce a second gas between the second light homogenizer tunnel and the diffusion tube to advect the contaminant out the third end and the sixth end, such that a ratio of contaminant remaining in the second enclosed space to contaminant advected from the second enclosed space is equal to or less than $10^{-6}$.

2. The apparatus of claim 1, wherein the first and second enclosed spaces have a respective rectangular shape in a cross-section orthogonal to a respective longitudinal axis for the first and second light homogenizer tunnels.

3. The apparatus of claim 1, wherein the diffusion tube is an elongated conical frustum.

4. The apparatus of claim 1, wherein:
the fourth end has a first cross-sectional area orthogonal to a longitudinal axis for the second light homogenizer tunnel; and,
the fifth end has a second cross-sectional area, orthogonal to the longitudinal axis, less than the first cross-sectional area.

5. The apparatus of claim 1, wherein:
the fifth end has a first cross-sectional area orthogonal to a longitudinal axis for the diffusion tube; and,
the sixth end has a second cross-sectional area, orthogonal to the longitudinal axis, greater than the first cross-sectional area.

6. The apparatus of claim 1, wherein:
the second light homogenizer tunnel includes a first longitudinal axis; and,
the diffusion tube includes a second longitudinal axis co-linear with the first longitudinal axis.

7. The apparatus of claim 1, wherein the first gas input or the second gas input includes a gas diffuser made of a sintered material.

8. The apparatus of claim 1, wherein the first gas input or the second gas input is a planar input.

9. The apparatus of claim 1, wherein the first gas input or the second gas input has an annular shape.

10. The apparatus of claim 1, further comprising a third enclosed area connecting the fourth and fifth ends.

11. An apparatus for contaminant control, comprising:
a light homogenizing tunnel including:
a longitudinal axis;
a first end arranged for connection to an extreme ultra-violet (EUV) light source;
a second end arranged for communication with a destination chamber; and,
an enclosed space:
connecting the first and second ends; and,
with a rectangular shape in a cross-section orthogonal to the longitudinal axis; and,
a sintered gas diffuser:
located between the first and second ends and arranged to reflect light from the EUV light source; and,
arranged to introduce a gas into the enclosed space such that the gas flows in a first direction toward the first end to advect a contaminant out the first end and in a second direction toward the second end to advect the contaminant out the second end, such that a ratio of contaminant remaining in the enclosed space to contaminant advected from the enclosed space is equal to or less than $10^{-6}$.

12. An apparatus for contaminant control, comprising:
a light homogenizer tunnel including:
a first end arranged for connection to an extreme ultra-violet (EUV) light source;
a second end having a first cross-sectional area; and,
a first enclosed space:
connecting the first and second ends; and,
with a rectangular shape in a cross-section orthogonal to a longitudinal axis for the light homogenizer tunnel;
a diffusion barrier tube including:
a third end facing the second end and having a second cross-sectional area less than the first cross-sectional area;
a fourth end arranged for communication with a destination chamber and having a third cross-sectional area greater than the second cross-sectional area; and,
a second enclosed space connecting the third and fourth ends; and,
a sintered gas diffuser:
located between the light homogenizer tunnel and the diffusion barrier tube; and,
arranged to introduce a gas between the light homogenizer tunnel and the diffusion barrier tube, wherein the gas advects a contaminant out the first end and the fourth end, such that a ratio of contaminant remaining in the first enclosed space or second enclosed space to contaminant advected from the first enclosed space or second enclosed space, respectively, is equal to or less than $10^{-6}$.

13. The apparatus of claim 12, further comprising a third enclosed area connecting the second and third ends.

* * * * *